: US006831486B1

United States Patent
Hynecek

(10) Patent No.: US 6,831,486 B1
(45) Date of Patent: Dec. 14, 2004

(54) CHARGE DETECTION NODE WITH VARIABLE CONVERSION GAIN AND KTC NOISE SUPPRESSION

(75) Inventor: Jaroslav Hynecek, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/674,858

(22) Filed: Sep. 30, 2003

(51) Int. Cl.[7] .................. H03K 17/78; H01L 41/00
(52) U.S. Cl. .................. 327/77; 327/514; 327/516; 348/311; 348/296
(58) Field of Search .................. 327/77, 87, 88, 327/514, 516, 284; 330/264, 267; 377/59, 60, 61, 63; 348/241, 311, 296, 300

(56) References Cited

U.S. PATENT DOCUMENTS 4,659,928 A * 4/1987 Tew .......................... 250/332
5,101,174 A * 3/1992 Hynecek ..................... 330/264
5,539,457 A * 7/1996 Tsunai ........................ 348/241
5,847,594 A * 12/1998 Mizuno ....................... 327/514

OTHER PUBLICATIONS

Albert J.P. Theuwissen, "Solid–State Imaging with Charge-Coupled Devices" Kluwer Academic Publishers, pp. 76–79, 1995.

* cited by examiner

Primary Examiner—Tuan T. Lam
(74) Attorney, Agent, or Firm—Alan K. Stewart; W. James Brady, III; Frederick J. Telecky, Jr.

(57) ABSTRACT

The Floating Diffusion charge detection system has incorporated a signal feedback directly into the charge-detection node. The feedback is coupled to the node from the output of the standard buffer amplifier A1 through a feedback amplifier A3, switching transistors S2 and S3, and capacitors $C_f$ and $C_h$. The feedback significantly reduces kTC noise, has good linearity, and improves DR.

14 Claims, 2 Drawing Sheets

US 6,831,486 B1

CHARGE DETECTION NODE WITH VARIABLE CONVERSION GAIN AND KTC NOISE SUPPRESSION

FIELD OF THE INVENTION

The present invention relates to solid-state image sensors, specifically to charge detection nodes of image sensors that employ feedback directly to the node to dynamically vary conversion gain.

BACKGROUND OF THE INVENTION

A typical image sensor senses light by converting impinging photons into electrons that are integrated (collected) in sensor pixels. After completion of integration cycle charge is converted into a voltage that is supplied to the output terminals of the sensor. The charge to voltage conversion is accomplished either directly in the sensor pixels, such as in the Active Pixel CMOS image sensors, or remotely, off the sensing area, in charge conversion amplifiers. The key element of every charge conversion amplifier is the charge detection node. As charge is transferred onto the node the node potential changes in proportion to the amount of transferred charge and this represents signal. The charge detection node is typically connected to a gate of a suitable MOS transistor that serves as a first stage of the amplifier. The charge detection node is also provided with reset transistor that removes charge from the node after sensing.

There are many charge detection node and amplifier designs known in the literature. The most popular structure is the Floating Diffusion (FD) architecture. The detail description of such systems can be found, for example, in the book: "Solid-State Imaging with Charge-Coupled Devices" by Albert J. P. Theuwissen pp. 76–79 that was published in 1995 by Kluwer Academic Publishers.

This patent deals with the FD type of charge detection node and describes improvements to the basic concept.

The performance of any charge detection system can be evaluated according to the following main criteria: the charge conversion factor, the dynamic range, noise floor, reset feed-through, and linearity. The charge conversion factor is determined by the overall detection node capacitance that also includes the node parasitic capacitances. It is thus desirable to minimize the parasitic capacitances and maximize the charge conversion factor. The dynamic range (DR) of the node is determined by the ratio of the maximum signal handling amplitude to the noise floor. It is desirable to minimize the noise floor in order to maximize the DR. The FD charge detection node has to be reset after sensing of charge. The reset is typically accomplished by turning on a reset transistor that is connected to the node. The reset transistor, however, causes reset noise. Reset noise needs to be reduced and this is typically accomplished by using a special signal processing method, somewhere downstream in the system, as is well known to those skilled in the art. Reset noise increases the detection node noise floor and therefore reduces DR. It is desirable to reduce reset noise right at the detection node itself rather than downstream in the signal processing chain. Another difficulty, typically encountered in standard charge detection node designs, is the problem of limited DR. It is desirable to have a large conversion gain in order to detect small amounts of charge. The large conversion gain also leads to smaller reset noise. However, it is also desirable to detect large signals with the same detection node particularly in the CCDs that use Charge Multipliers. To detect large amounts of charge the detection node must have a smaller conversion gain, therefore larger capacitance, and thus higher noise floor. These are contradictory requirements that cannot be satisfied at the same time. In practice it is difficult to find a good compromise with the current state of the art detection node designs that cannot dynamically vary conversion gain and that have reset noise eliminated elsewhere in the system.

SUMMARY OF THE INVENTION

It is an object of the present invention to overcome limitations in the prior art. It is a further object of the present invention to provide a practical FD charge detection node design that minimizes reset noise directly at the detection node itself, which results in a low noise floor and a high DR. It is yet another object of the present invention to provide a practical high performance charge detection node design where the conversion gain may be varied. Finally, it is the object of the present invention to provide the FD charge detection node design that has high DR, good linearity, and a dynamically variable charge conversion gain where the gain is varied according to the expected signal in a programmable fashion using a DSP.

Incorporating a feedback system directly into the charge detection node that uses a variable gain amplifier, which may be controlled by a suitable DSP, achieves these and other objects of the invention.

DETAILED DESCRIPTION OF PREFERRED EMBODIMENTS

Figure 1:
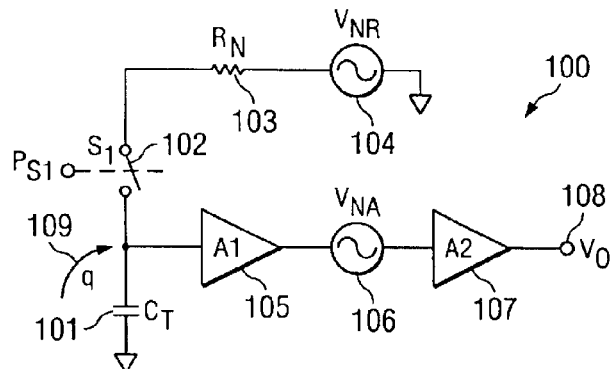
FIG. 1 is a simplified circuit diagram of a prior art charge detection system.

In FIG. 1 the drawing 100 represents a simplified circuit diagram that describes operation of the typical prior art charge detection system. A reset transistor, which is represented in the drawing by switch 102 (S1), resets detection node capacitance 101 ($C_t$). The signal that appears on the capacitor, after charge is transferred onto the node, is buffered by the dual stage source follower represented by amplifiers 105 (A1) and 107 (A2).

When charge 109 is transferred onto the charge detection node represented by capacitor $C_t$, the node potential changes and amplifier A1 senses this change. The amplifier A1 ads its own noise to the signal and this is represented by voltage source 106 ($V_{na}$). The output of amplifier 105 is typically buffered by additional amplifier stages A2 before the signal is supplied to device output 108 ($V_o$). Sensed charge is removed from the node by momentarily closing switch 102 (S1) using control signal $P_{s1}$. During this cycle, the node is connected to the reference voltage generator represented by its output resistance 103 ($R_n$) and corresponding noise voltage generator 104 ($V_{nr}$). When switch S1 is opened again some of the noise voltage remains on the node. The amount of charge that is introduced onto the capacitor $C_t$ by this action has a variance $\sigma_q^2 = kTC_t$ and for this reason this reset noise is called kTC noise. It is desirable to design charge detection nodes with capacitance $C_t$ as small as possible since this increases the node conversion factor and at the same time reduces kTC noise. The undesirable effect of kTC noise is minimized by so-called Correlated Double Sampling (CDS) processing as is well know in the art. The CDS signal-processing method essentially consists of sampling the output signal twice, the first time after the reset before charge is transferred onto the node and the second time after the charge transfer. The desired signal, with most of kTC noise removed, is then the difference of these two readings. There are two problems with this method of charge detection. The first problem is that kTC noise is added to the signal and must be removed later by subtraction. This reduces DR that is available on the node. In addition, the double sampling is adding up noise $V_{na}$ produced by amplifier A1. This noise is not correlated between the two readings and, therefore, does not subtract. The second problem is that for small node capacitances the maximum amount of sensed charge is also small and cannot be increased without the node redesign. On the other hand, when the node has a large capacitance to handle large amounts of charge, the node kTC noise also becomes large.

Figure 2:
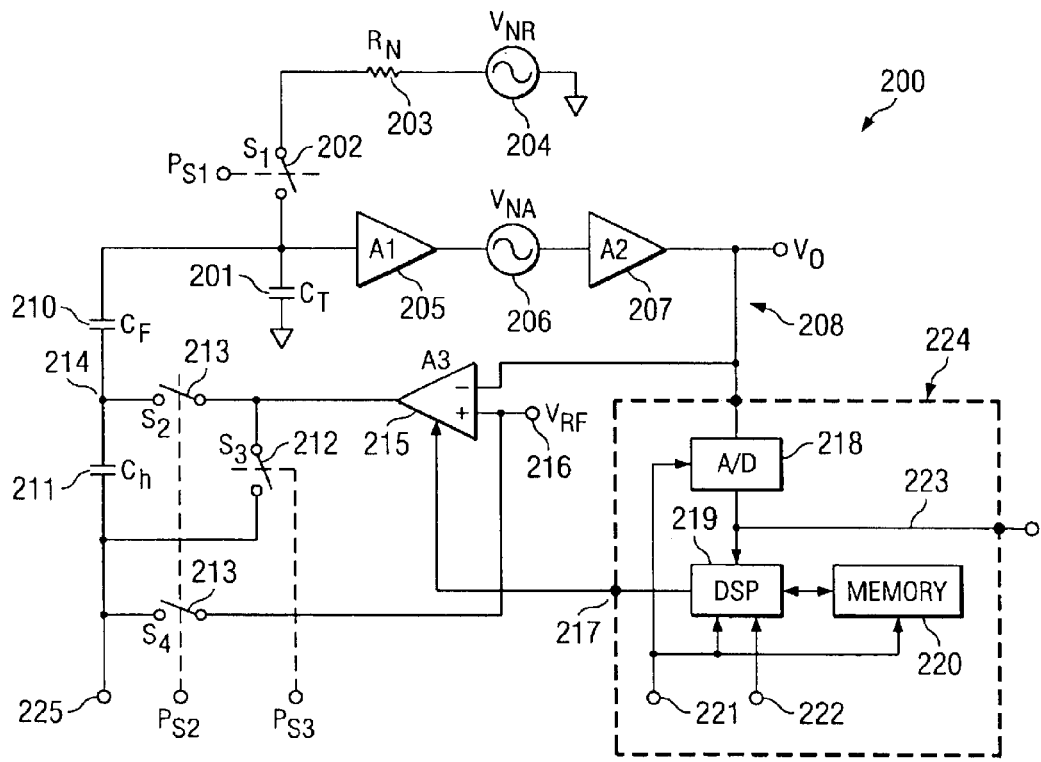
FIG. 2 is a simplified circuit diagram of a charge detection device according to the present invention.

In FIG. 2 the drawing 200 represents a simplified circuit diagram of the present invention. Two capacitors 210 ($C_f$) and 211 ($C_h$) have been connected to the node. The feedback to the node is supplied through amplifier 215 (A3) and capacitors either $C_f$ or $C_h$ and $C_f$ depending on the sate of the switches 213 (S2,S4) and 212 (S3). The dual path switch S2,S4 momentarily charges capacitor $C_h$ at appropriate time intervals. The gain of the amplifier A3 is controlled by suitable DSP system 219 that receives digitized signals from the node output, the memory 220, the image sensor clocks 221, and additional control lines.

In this circuit the holding capacitor $C_h$ with the feedback capacitor $C_f$ in series are connected to detection node capacitance 201 ($C_t$). The switch 202 (S1) resets the detection node to reference voltage generator 204 that has equivalent noise resistance 203 ($R_n$) with corresponding noise voltage generator 204 ($V_{nr}$). Amplifiers 205 (A1) and 207 (A2) buffer the signal and supply it to the chip output bus 208 ($V_{oa}$). The equivalent noise voltage generator 206 ($V_{na}$) represents Johnson noise of the amplifiers. The system feedback has two possible paths: in the first path the signal proceeds to the input of Amplifier A3 that has Gain Controlling (AGC) capability and from this amplifier via the switch S2 through the capacitor $C_f$ to the detection node. Switch S2 is controlled by control signal $P_{s2}$. In the second path the feedback signal proceeds from amplifier A3 through switch S3, then through the holding capacitor $C_h$, to the feedback capacitor $C_f$ and finally to the detection node. Switch S3 is controlled by control signal $P_{s3}$. Amplifier A3 can attain gains $A_{f1}$, or $A_{f2}$ depending on the control signal supplied to it from digital signal processor DSP sub block 224. The amplifier A3 uses voltage reference 216 ($V_{rf}$) that is also connected to holding capacitor $C_h$ through switch S4. The digital signal processor controls the gain of the AGC amplifier A3 via connection 217. DSP processor may be connected to memory 220 (MEM) if it does not have its own internal one. The sensor output signal from the output bus 208 is digitized by analog-to-digital (A/D) converter 218 and is supplied to the processor DSP via digital bus 223. This digital bus also provides digital signal $V_{od}$ to the rest of the image processing system. DSP processor, memory MEM, and A/D converter are clocked with the clocking signals 221. Additional input controls may be provided to the DSP via bus 222.

Figure 3:
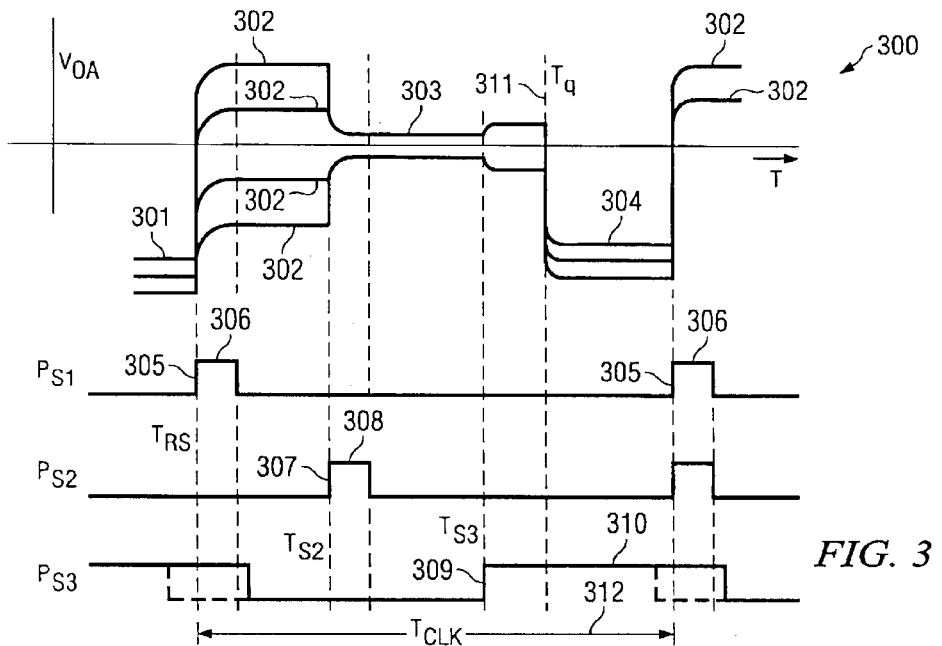
FIG. 3 shows a simplified graph of the output voltage waveform with the corresponding timing signals for the switches S1, S2 and S3.

The operation of the system is best explained with the help of the timing diagram 300 in FIG. 3. Pulse 306 applied to switch S1 at time 305 ($t_{rs}$) resets the detection node but also introduces large reset noise. Pulse 308 applied to switch S2 at time 307 ($t_{s1}$) activates the feedback, which reduces reset noise. Amplifier gain may be changed at various times 309 ($t_3$) of the clocking period, particularly prior to arrival of charge at time 311 ($t_q$).

The diagram shows a simplified graph of the output signal and three additional control signals $P_{s1}$, $P_{s2}$, and $P_{s3}$ that operate the switches S1, S2, S3, and S4. Applying pulse 306 at the time $t_{rs}$ to the reset switch S1 resets the node signal level 301 to a new reset level 302. This new reset level, however, is not unique and changes from reset to reset as is indicated in the graph. This variation represents kTC noise. After applying second pulse 308 to switches S2 and S4 at the time $t_{s2}$, a strong negative feedback loop is closed from the output bus 208 to the detection node. The amplifier gain has been changed prior to this time, to a high negative value $A_{f2}$ and the switch S3 turned off by the control signal $P_{s3}$. As a result of this feedback the output signal changes to new level 303 and kTC noise at the node is significantly reduced. After completion of this cycle and just before arrival of new charge on the detection node at the time $t_q$, the switch S3 is turned on by pulse 310 at the time $t_{s3}$. After charge arrival, the output changes to the new level 304 depending on the amount of received charge. The gain of the amplifier A3 is changed back from the strong negative value $A_{f2}$ to the original value $A_{f1}$. This completes the entire clocking cycle 312 ($t_{clk}$). The value of the gain $A_{f1}$ can be either positive or negative. The negative $A_{f1}$ gain reduces the charge detection node conversion gain while the positive $A_{f1}$ gain increases it. By a suitable gain adjustment the detection node can accommodate much larger range of charge quantities. The gain can also be adjusted in a predictable fashion based on the signal that is anticipated to arrive on the detection node. These gain values can be either programmed into the system memory or can be automatically calculated from the signal detected in previous frames. This, and many other similar methods of system control are well known to those skilled in the art. The pulses $P_{s1}$, $P_{s2}$, and $P_{s3}$ have certain pulse widths that depend on the feedback system bandwidth. This is also well known to those skilled in the art.

In another embodiment of the present invention when the feedback amplifier A3 cannot have easily changeable gain and the DSP circuits in the sub circuit 224 are not available, it is possible to operate the feedback charge detection system with the gain of the feedback amplifier A3 at a constant value $A_{f2}$. The analog output is then available in an inverted form at the terminal 225 instead of at the bus 208. The circuit is now very simple, however, the conversion gain is constant and cannot be varied. The feedback still provides wider DR, improved linearity, and kTC noise suppression directly at the detection node.

Figure 4:
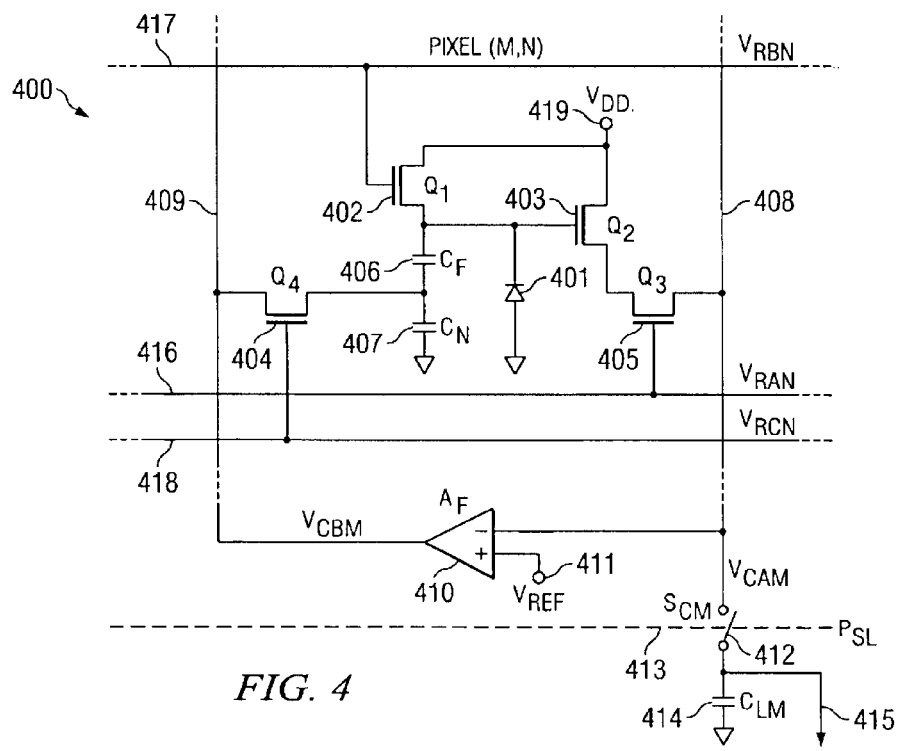
FIG. 4 shows a simplified circuit diagram of a pixel in an array of a typical APS CMOS sensor.

In FIG. 4 the drawing 400 is the simplified circuit diagram of the invention as one possible implementation in Active Pixel image Sensors (APS). The feedback amplifier 410 ($A_f$) is common to all the pixels in the same column. Turning on second address transistor 404 (Q4) via additional row address line 418 activates this feedback. The feedback reduces pixel reset noise and the transistor threshold pixel-to-pixel non-uniformities.

One pixel with coordinates (m,n) in the array is shown with the column feedback amplifier $A_f$ that is shared for all the pixels in that column. The light induced charge is collected on the capacitor represented by the reverse biased diode 401. The buffer amplifier is only single transistor 403 (Q2) that is addressed by transistor 405 (Q3) when an appropriate addressing pulse is applied to its gate via row addressing bus 416 ($V_{ran}$). The feedback to the pixel is applied via column bus 409 ($V_{cbm}$) and through the feedback-addressing transistor Q4. The pulse applied to the row address bus $V_{rcn}$ turns this transistor on. Holding capacitor 407 ($C_h$) and feedback capacitor 406 ($C_f$) complete the feedback loop and are connected in parallel to the charge detection node as in the previous examples. The node is reset by transistor 402 (Q1) to node 419 ($V_{dd}$) when a pulse is applied to row address bus 417 ($V_{rbn}$). The pixel output that appears on column bus 408 ($V_{cam}$), is sampled by switch 412 ($S_{cm}$), and stored on column capacitor 414 ($C_{lm}$). Switch $S_{cm}$ is controlled by signal 413 ($P_{s1}$). The horizontal buffer (not shown in the drawing) scans the stored data through line 415. Other methods of reading the array of pixels, which do not require the holding capacitors $C_{lm}$, are also possible. This is well known to those skilled in the art. The operation of this pixel is similar to the operation of the charge detection node of the previous examples, so it does not need to be further described. The only significant difference that should be noticed, however, is that due to sharing of the column amplifier among the pixels of the same column, the feedback cannot be closed during the charge integration cycle and that only a single path switch S2 (transistor Q4) instead of two switches S2 and S3 is used. The feedback concept as applied to APS provides another advantage by minimizing the pixel-to-pixel non-uniformities. When the pixel feedback is turned on, the pixel output is always reset to the same reference level of the column feedback amplifier $V_{ref}$ for every pixel in that column regardless of the threshold variations of the pixel's buffer transistors Q2. The disadvantage here is that the pixel conversion gain cannot be easily dynamically changed.

The charge detection nodes, according to the present invention, have good linearity, low kTC noise, and high Dynamic Range. The feedback is provided through a small capacitor connected to the node. The capacitor is either added to the node just for this purpose or already exists there as a shield of the reset pulse feed through. By switching on the feedback at suitable time intervals during the pixel readout using an amplifier with a variable gain, the node conversion gain may be dynamically changed according to the expected signal. The gain switching may be accomplished using a suitable A/D converter and a DSP with memory that controls the gain of the feedback amplifier. In addition to variable and programmable gain, reset noise of such detection nodes is significantly reduced. The described invention can be used for charge detection in CCD as well as in CMOS image sensors.

The benefits of the negative feedback directly to the charge detection node of reduced kTC noise, increased DR, and improved node linearity are thus clearly understood from the above description of several preferred embodiments of the present invention.

Having described preferred embodiments of the novel charge detection node with variable conversion gain, good linearity, high DR, low feed through, and low noise, that includes feedback directly to the detection node, which are intended to be illustrative and not limiting, it is noted that modifications and variations can be made by persons skilled in the art in light of the above teachings. It is therefore to be understood that changes may be made in the particular embodiments of the invention disclosed, which are within the scope and spirit of the invention as defined by the appended claims.

What is claimed is:

1. A charge detection device comprising:

a charge detection node;

a buffer amplifier having an input coupled to the charge detection node;

a reset switch coupled to the charge detection node;

a feedback capacitor having a first end coupled to the charge detection node;

a holding capacitor having a first end coupled to a second end of the feedback capacitor; and a feedback amplifier having a first input coupled to an output of the buffer amplifier and an output coupled to the second end of the feedback capacitor.

2. The device of claim 1 further comprising a feedback switch coupled between the output of the feedback amplifier and the second end of the feedback capacitor.

3. The device of claim 2 further comprising a first switch coupled between the output of the feedback amplifier and a second end of the holding capacitor.

4. The device of claim 3 further comprising a second switch coupled between a second input of the feedback amplifier and the second end of the holding capacitor, wherein the second switch is clocked in phase with the feedback switch.

5. The device of claim 4 further comprising a reference voltage node coupled to the second input of the feedback amplifier.

6. The device of claim 1 wherein the feed back amplifier has a variable gain level.

7. The device of claim 6 further comprising a processing device having an input coupled to the output of the buffer amplifier and an output coupled to a gain control node of the feedback amplifier, wherein the processing device controls the variable gain level of the feedback amplifier.

8. The device of claim 7 wherein the variable gain level of the feedback amplifier is set in predetermined time intervals to values determined by the processing device.

9. The device of claim 8 wherein the processing device comprises a memory from which the variable gain level is determined.

10. The device of claim 9 wherein the processing device further comprises a digital signal processor for computing the variable gain level.

11. The device of claim 10 wherein the processing device further comprises an analog-to-digital converter coupled between the output of the buffer amplifier and the digital signal processor.

12. The device of claim 6 wherein the variable gain level is periodically changed within predetermined pulse intervals that are in correlation with charge arriving on the charge detection node.

13. The device of claim 2 wherein the feedback amplifier is shared by all charge detection nodes in one column, wherein the charge detection nodes are reset and addressed by pulses supplied through row addressing lines and the feedback switch is addressed by pulses supplied through the row addressing lines.

14. The device of claim 2 wherein the feedback transistor is addressed by pulses supplied through a column addressing line.

* * * * *